United States Patent
Aiello et al.

(10) Patent No.: US 6,952,456 B1
(45) Date of Patent: Oct. 4, 2005

(54) ULTRA WIDE BAND TRANSMITTER

(75) Inventors: Roberto Aiello, Palo Alto, CA (US); Gerald Rogerson, Morgan Hill, CA (US); Carlton Sparrell, Palo Alto, CA (US); Jacob Tuft, San Francisco, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 740 days.

(21) Appl. No.: 09/599,969

(22) Filed: Jun. 21, 2000

Related U.S. Application Data

(63) Continuation of application No. PCT/US01/19908, filed on Jun. 21, 2000.

(51) Int. Cl.$^7$ .......................... H04L 27/04; H03C 1/52; H03C 1/00; H03C 1/50

(52) U.S. Cl. ...................... 375/295; 375/300; 332/149; 332/151

(58) Field of Search .............................. 375/295, 200, 375/210, 132, 219, 222, 237, 238, 239, 242, 375/256, 260, 261, 268, 300; 370/324; 342/28, 342/135; 455/103; 332/149, 151

(56) References Cited

U.S. PATENT DOCUMENTS

| | | |
|---|---|---|
| 3,668,639 A | 6/1972 | Harmuth |
| 3,678,204 A | 7/1972 | Harmuth |
| 3,728,632 A | 4/1973 | Ross |
| 3,875,524 A | 4/1975 | Harzer et al. |
| 4,232,339 A | 11/1980 | Smiley et al. |
| 4,506,267 A | 3/1985 | Harmuth |
| 4,574,378 A | 3/1986 | Kobayashi |
| 4,641,317 A | 2/1987 | Fullerton |
| 4,644,534 A | 2/1987 | Sperlich |
| 4,651,152 A | 3/1987 | Harmuth |
| 4,672,608 A | 6/1987 | Ball et al. |
| 4,743,906 A | 5/1988 | Fullerton |
| 4,763,325 A | 8/1988 | Wolfe et al. |
| 4,813,057 A | 3/1989 | Fullerton |
| 5,134,408 A | 7/1992 | Harmuth |
| 5,146,616 A * | 9/1992 | Tang et al. .................. 455/103 |
| 5,148,174 A | 9/1992 | Harmuth |

(Continued)

FOREIGN PATENT DOCUMENTS

| | | | |
|---|---|---|---|
| EP | 0 307 962 A2 | 3/1989 | ............ H04B 7/24 |

(Continued)

OTHER PUBLICATIONS

J. Husted et al., "A Time-Division Multiple-Access System For The Defense Satellite Communication System", 1970 *Eascon*, pp. 229-237, Oct. 1970.

(Continued)

*Primary Examiner*—Temesghen Ghebretinsae
*Assistant Examiner*—Sam K. Ahn
(74) *Attorney, Agent, or Firm*—Pulse-LINK, Inc.

(57) ABSTRACT

A transmitter system is provided. In one embodiment, the transmitter system includes a data modulation unit, which generates a stream of data that is synchronized with a master clock. The transmitter system additionally includes a transmitter that transmits the stream of synchronized data by way of an attached antenna. In another embodiment the transmitter system includes a Medium Access Control (MAC) layer that includes a clock synchronization device, a frequency divider, a slot allocation unit, and a multiplexer/demultiplexer. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

6 Claims, 11 Drawing Sheets

U.S. PATENT DOCUMENTS

| | | | |
|---|---|---|---|
| 5,153,595 | A | 10/1992 | Harmuth |
| 5,159,343 | A | 10/1992 | Harmuth |
| 5,307,081 | A | 4/1994 | Harmuth |
| 5,334,975 | A | 8/1994 | Wachob et al. |
| 5,365,240 | A | 11/1994 | Harmuth |
| 5,493,691 | A | 2/1996 | Barrett |
| 5,519,400 | A * | 5/1996 | McEwan .................... 342/28 |
| 5,523,758 | A | 6/1996 | Harmuth |
| 5,586,145 | A | 12/1996 | Morgan et al. |
| 5,592,177 | A | 1/1997 | Barrett |
| 5,594,738 | A | 1/1997 | Crisler et al. |
| 5,610,907 | A | 3/1997 | Barrett |
| 5,644,576 | A * | 7/1997 | Bauchot et al. ............ 370/437 |
| 5,675,388 | A | 10/1997 | Cooper |
| 5,677,927 | A * | 10/1997 | Fullerton et al. ........... 375/200 |
| 5,687,169 | A * | 11/1997 | Fullerton .................. 370/324 |
| 5,715,236 | A | 2/1998 | Gilhousen et al. |
| 5,748,891 | A | 5/1998 | Fleming et al. |
| 5,761,197 | A | 6/1998 | Takefman |
| 5,812,671 | A | 9/1998 | Ross |
| 5,832,035 | A * | 11/1998 | Fullerton .................. 375/210 |
| 5,850,422 | A | 12/1998 | Chen |
| 5,886,652 | A | 3/1999 | Adachi et al. |
| 5,889,767 | A | 3/1999 | Kimura |
| 5,903,605 | A | 5/1999 | Crittenden |
| 5,909,491 | A | 6/1999 | Luo |
| 5,920,278 | A | 7/1999 | Tyler et al. |
| 5,940,435 | A | 8/1999 | Hendrickson |
| 6,002,708 | A | 12/1999 | Fleming et al. |
| 6,026,125 | A * | 2/2000 | Larrick et al. .............. 375/295 |
| 6,031,862 | A * | 2/2000 | Fullerton et al. ........... 375/200 |
| 6,041,051 | A | 3/2000 | Doshi et al. |
| 6,064,697 | A | 5/2000 | Yoshikawa |
| 6,067,648 | A | 5/2000 | Hunter et al. |
| 6,069,887 | A | 5/2000 | Geiger et al. |
| 6,097,766 | A | 8/2000 | Okubo et al. |
| 6,122,291 | A | 9/2000 | Robinson et al. |
| 6,133,875 | A | 10/2000 | Kishimoto |
| 6,133,876 | A | 10/2000 | Fullerton et al. |
| 6,161,138 | A | 12/2000 | Gross et al. |
| 6,172,965 | B1 | 1/2001 | Edwards et al. |
| 6,177,903 | B1 | 1/2001 | Fullerton et al. |
| 6,178,217 | B1 | 1/2001 | Defries et al. |
| 6,181,687 | B1 | 1/2001 | Bisdikian |
| 6,212,230 | B1 | 4/2001 | Rybicki et al. |
| 6,232,910 | B1 | 5/2001 | Bell et al. |
| 6,236,662 | B1 | 5/2001 | Reilly |
| 6,239,741 | B1 * | 5/2001 | Fontana et al. ............. 342/135 |
| 6,246,277 | B1 | 6/2001 | Nitta et al. |
| 6,275,500 | B1 | 8/2001 | Callaway et al. |
| 6,292,153 | B1 | 9/2001 | Aiello et al. |
| 6,300,903 | B1 | 10/2001 | Richards et al. |
| 6,310,865 | B1 | 10/2001 | Ohki |
| 6,324,397 | B1 | 11/2001 | Adachi et al. |
| 6,351,468 | B1 | 2/2002 | LaRowe et al. |
| 6,351,652 | B1 | 2/2002 | Finn et al. |
| 6,385,461 | B1 | 5/2002 | Raith |
| 6,400,308 | B1 | 6/2002 | Bell et al. |
| 6,424,645 | B1 | 7/2002 | Kawabata et al. |
| 6,437,832 | B1 | 8/2002 | Grabb et al. |
| 6,449,265 | B1 | 9/2002 | Prieto, Jr. |
| 6,463,042 | B1 | 10/2002 | Paatelma |
| 6,477,171 | B1 | 11/2002 | Wakeley et al. |
| 6,480,505 | B1 | 11/2002 | Johansson et al. |
| 6,492,904 | B2 | 12/2002 | Richards |
| 6,497,656 | B1 | 12/2002 | Evans et al. |
| 6,505,032 | B1 | 1/2003 | McCorkle et al. |
| 6,510,150 | B1 | 1/2003 | Ngo |
| 6,519,460 | B1 | 2/2003 | Haartsen |
| 6,539,213 | B1 | 3/2003 | Richards et al. |
| 6,549,567 | B1 | 4/2003 | Fullerton |
| 6,574,266 | B1 | 6/2003 | Haartsen |
| 6,597,683 | B1 | 7/2003 | Gehring et al. |
| 6,603,818 | B1 * | 8/2003 | Dress et al. ................ 375/295 |
| 6,621,857 | B1 | 9/2003 | Belotserkovsky et al. |
| 6,625,229 | B2 | 9/2003 | Dress et al. |
| 6,628,642 | B1 | 9/2003 | Mile'n et al. |
| 6,633,558 | B1 | 10/2003 | Cho et al. |
| 6,668,008 | B1 | 12/2003 | Panasik |
| 6,697,382 | B1 | 2/2004 | Eatherton |
| 6,707,828 | B1 | 3/2004 | Wolf |
| 6,735,238 | B1 | 5/2004 | McCorkle et al. |
| 6,735,734 | B1 | 5/2004 | Liebetreu et al. |
| 6,747,959 | B1 | 6/2004 | Ho |
| 2001/0055353 | A1 | 12/2001 | Rybicki et al. |
| 2002/0018458 | A1 | 2/2002 | Aiello et al. |
| 2002/0131370 | A1 | 9/2002 | Chuah et al. |
| 2003/0054764 | A1 | 3/2003 | McCorkle et al. |

FOREIGN PATENT DOCUMENTS

| | | | |
|---|---|---|---|
| EP | 0 817 399 A2 | 1/1998 | ............ H04B 3/54 |
| EP | 0 825 794 A2 | 2/1998 | |
| EP | 0 817 399 A3 | 7/1998 | ............ H04B 3/54 |
| EP | 0 825 794 A3 | 1/2000 | |
| EP | 0 307 962 A3 | 5/2000 | ............ H04B 7/24 |
| WO | WO 91/07030 A1 | 5/1991 | ............. H04J 3/26 |
| WO | WO 95/23461 A1 | 8/1995 | .......... H04B 10/10 |
| WO | WO 97/21294 A2 | 6/1997 | ........... H04L 12/28 |
| WO | WO 98/27670 A1 | 6/1998 | ............ H04B 7/08 |
| WO | WO 01/93434 A2 | 10/2001 | |
| WO | WO 02/31986 A2 | 4/2002 | |

OTHER PUBLICATIONS

L. Roberts, "Aloha Packet System With and Without Slots and Capture", *Computer Communication Review*, vol. 5, No. 2, pp. 28-41, Apr. 1975.

"IEEE Standards for Local Area Networks: Carrier Sense Multiple Access with Collision Detection", ANSI/IEEE Std. 802.3-1985, The Institute of Electronic and Electrical Engineers, pp. 1-143, Dec. 1984.

B. Schneier, *Applied Cryptography*, Chapter 10, Sec. 10.3, 12.2, pp. 216-220, 270-278, John Wiley & Sons, Inc., Oct. 1995.

"Information technology-Open Systems Interconnection-Basic Reference Model: The Basic Mode", *ISO/IEC 7498-1:1994(E)*, pp. 1-59, corrected and reprinted Jun. 15, 1996.

"Radio Equipment and Systems (RES); High Performance Radio Local Area Network (HIPERLAN), Type 1 Function specification", European Telecommunication Standards Institute, pp. 1-115, Dec. 1997.

M. Win, "ATM-Based TH-SSMA Network for Multimedia PCS", *IEEE Journal on Selected Areas in Communication*, vol. 17, No. 5, pp. 824-836, May 1999.

S. Ramsey et al., "A Wireless Photoconductive Receiver Using Impulse Modulation and Direct Sequence Code Division", *Microwave Photonics*, pp. 265-268, Nov. 17, 1999.

"802.1D and 802.1Q Bridging Conformance" TA Document IEEE802.17-Jul. 11, 2001/040:3, 1394 Trade Association, 7 pages, Oct. 2001.

Brunoi Pattan, A Brief Exposure to Ultra-Wideband Signaling, Microwave Journal, Dec. 2003, 5 pages.

David G. Leeper, Wireless Data Blaster, Scientific American, May 2002, pp. 65-69.

Dr. James P. K. Gilb, Wireless Multimedia . . . A Guide to the IEEE 802.15.3 Standard, Mar. 2004, pp. 23-63.

Aether Wire & Location, Inc., Robert Fleming et al., "Low-Power, Miniature, Distributed Position Location and Communication Devices Using Ultra-Wideband, Nonsinusoidal Communication Technology," Semi-Annual Technical Report Prepared for: ARPA/FBI, Jul. 1995, pp. 1-40.

Aether Wire & Location, Inc., Robert Fleming et al., "Integrated, Low-Power, Ultra-Wideband Tranceivers for Distributed Position Location and Communication," Technical Abstracts of Proposal to Defense Advanced Research Projects Agency (DARPA), Part I—Technical Proposal, 1998, pp. 1-52.

* cited by examiner

ULTRA WIDE BAND TRANSMITTER

This application is a continuation of PCT/US01/19908 filed Jun. 21, 2000.

BACKGROUND OF THE INVENTION

1. Field of the Invention

This invention pertains generally to a wireless data transmitter. More particularly, the invention relates to an ultra wide band transmitter for transmitting base band signals.

2. The Prior Art

Wireless communication increasingly relies on the transmission of data in digital formats. Typically, a data stream is modulated onto a carrier frequency, and the modulated carrier signal is transmitted over a communications channel from a transmitter to a receiver. Generally, these communication systems use conventional narrow band modulated carriers for wireless network communication.

There are important disadvantages associated with using conventional narrowband modulated carrier frequencies. Particularly, in multipath environments such as inside rooms and buildings, data communication degrades because of multipath propagation or fading and can result in poor signal reception. Further, the rapidly increasing use of wireless consumer products has "crowded the airwaves" and will result in increasing interference with reception of data. Still further, narrow band modulated carriers rely on use of relatively expensive components such as high-Q filters, precise local high-frequency oscillators, and power amplifiers.

Spread-spectrum signals for digital communications were originally developed and used for military communications either to provide resistance to jamming or to hide the signal by transmitting the signal at low power and, thus, make it difficult for an unintended listener to detect its presence in noise. More recently, spread-spectrum signals have been used to provide reliable communications in a variety of civilian applications, including mobile vehicular communications.

There are several types of spread spectrum signals. In one type, the basic elements of a spread spectrum digital communication system include a channel encoder, modulator, channel decoder, demodulator, and two synchronized sequence generators, one which interfaces with the modulator at the transmitting end and the second which interfaces with a demodulator at the receiving end. These two generators produce a binary-valued sequence that is used to periodically change the carrier frequency and thus spread the transmitted signal frequency at the modulator and to follow the carrier frequency of the received signals at the demodulator.

In carrier-based frequency-hopped spread spectrum the available channel bandwidth is subdivided into a large number of non-overlapping frequency slots. In any signaling interval the transmitted signal carrier occupies one of the available frequency slots. The selection of the frequency slots in each signal interval is made either sequentially or pseudorandomly according to the output from a pseudo-noise generator. The receiver tuning follows the frequency hopping of the transmitted carrier.

Another alternative spread spectrum communication system uses base band signals. In base band spread spectrum communication, information may be transmitted in short pulses, modulated by relatively simple keying techniques, with power spread across a frequency band. With the signal spectrum spread across a frequency band, frequency selective fading and other disadvantages of narrow band communication can be avoided. Base band technology has previously been used in radar applications, wherein a single short impulse is directed to a target. The short impulse, spread across a large bandwidth, has significantly reduced spectral power density and thus has a reduced probability of detection and interference.

Ultra wide band (UWB) is a wireless technology for transmitting large amounts of digital data over a wide spectrum of frequency bands with very low power. UWB is an extension of conventional spread spectrum technology. The major distinction is that while conventional spread spectrum signals require a few megahertz to about 20 to 30 MHz of bandwidth, UWB uses vastly more spectrum from a few megahertz to several gigahertz. Therefore, UWB communication systems broadcast digital pulses that are timed very precisely on a signal across a very wide spectrum. The transmitter and receiver must be coordinated to send and receive at the proper time. One of the applications for UWB is to allow low powered voice and data communications at very high bit rates.

The transmission of digital data of short pulses over an UWB spectrum would avoid the problems associated with narrow band data communications, and the cost and complexity of spread spectrum communications. Suitable, cost effective transmitter architectures for transmitting such data transmissions, have heretofore been unavailable.

Accordingly, there is a need for a UWB base band transmitter system and method which can transmit data in the form of short UWB pulses which can be used with a network of transceiver node devices, which is not susceptible to multipath fading or interference with a narrowband communication system, which can be used for indoor applications, and which is relatively simple and inexpensive to implement. The present invention satisfies these needs, as well as others, and generally overcomes the deficiencies found in the background art.

Therefore, it would be beneficial to provide an invention having a base band transmitter which transmits data in the form of ultra-short spread spectrum pulses.

It would also be beneficial to provide a base band transmitter capable of transmitting signals using different modulation techniques.

It would be further beneficial to provide a base band transmitter capable of transmitting signals with a variable pulse repetition frequencies.

It would be beneficial to provide a base band transmitter capable of transmitting two different modulation methods such as on-off keying and pulse amplitude modulation.

It would be beneficial to provide a base band transmitter which allows synchronization to a master clock of a remote master transceiver device in a multiple transceiver device network.

Further benefits of the invention will be brought out in the following portion of the specification wherein the detailed description is for the purpose of fully disclosing the preferred embodiment of the invention without placing limitations thereon.

SUMMARY OF THE INVENTION

The present invention is a transmitter system comprising a data modulation unit, a transmitter unit and an antenna. The data modulation unit is configured to generate a digital data pulse stream which is synchronized with a master clock. The transmitter unit is coupled to the data modulation unit. The transmitter unit is configured to receive the digital stream of pulse data and generates a RF pulse stream for transmission. The antenna is coupled to the transmitter unit and the antenna is configured to transmit the RF pulse stream.

The data modulation unit is configured to support pulse streams having different modulation techniques. The different modulation techniques include on-off keying and pulse amplitude modulation. The data modulation unit includes a pulse amplitude modulation module which is configured to vary the amplitude of a modulated pulse. The data modulation unit may also be configured to include a pulse repetition frequency module which is configured to vary the pulse repetition frequency. Further still, the data modulation unit may be configured to include both a pulse amplitude modulation module and a pulse repetition frequency module.

The present invention includes a transmitter Medium Access Control (MAC) layer comprising a clock synchronization unit, at least one frequency divider, at least one slot allocation unit, and a multiplexer/demultiplexer. The clock synchronization unit has a timing device with a clock speed. The at least one frequency divider is coupled to the clock synchronization unit in which the at least one frequency divider is configured to reduce the clock speed to obtain a desired pulse repetition frequency. The multiplexer/demultiplexer is operatively coupled to the at least one slot allocation unit and the multiplexer/demultiplexer is configured to merge outgoing signals generated by the slot allocation units and distribute incoming signals.

The present invention also describes a transmitter system configured to transmit pulse amplitude modulated signals, comprising a clock interface, a pulse generator system, a drive system, a data interface, and a variable gain amplifier or attenuator. The clock interface is configured to generate a clock signal. The pulse generator system is coupled to the clock interface and generates a pulse shape for incoming pulses. The drive system coupled to the pulse generator system is configured to amplify and combine the incoming pulses. The data interface is configured to generate a data signal. The variable gain amplifier or attenuator is operatively coupled to the data interface and is coupled to the drive system. The variable gain amplifier or attenuator provides a means to obtain the desired amplitude for pulse amplitude modulated transmissions.

BRIEF DESCRIPTION OF THE DRAWING FIGURES

The present invention will be more fully understood by reference to the following drawings, which are for illustrative purposes only.

Figure 6A:
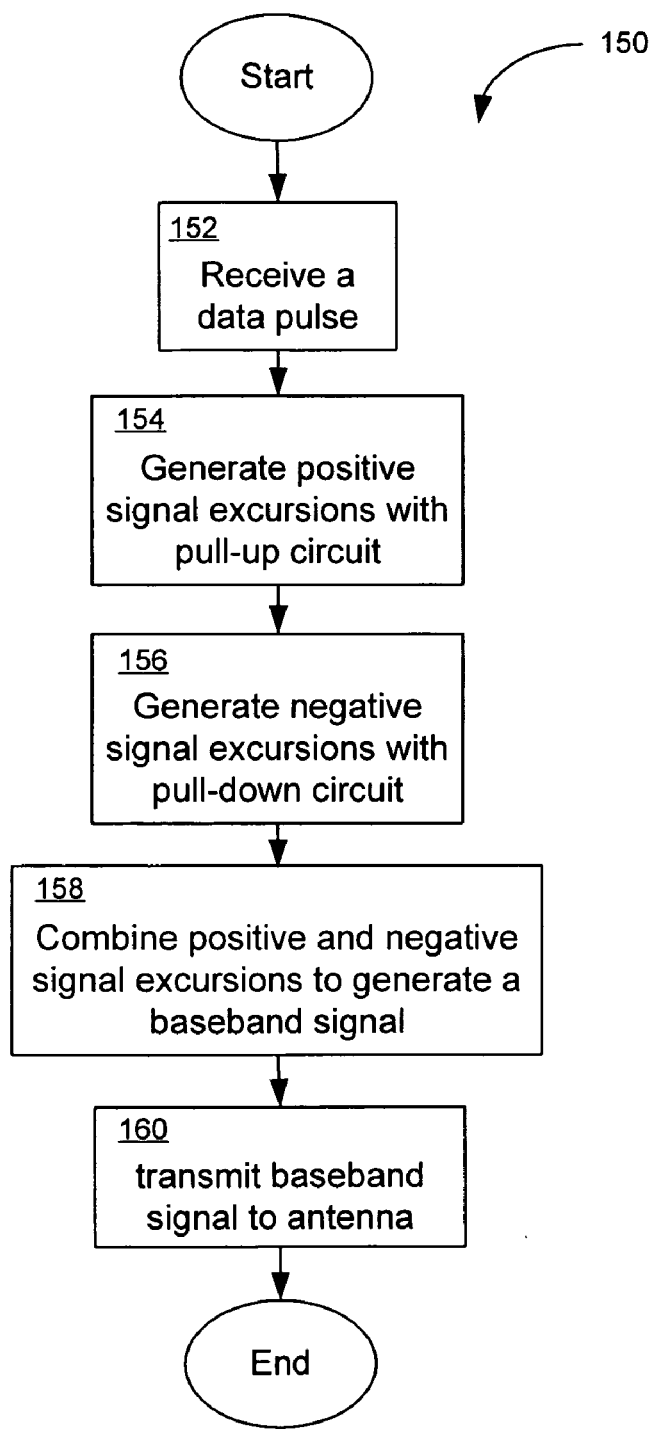

FIG. 6a presents a method for generating a baseband signal.

Figure 6B:
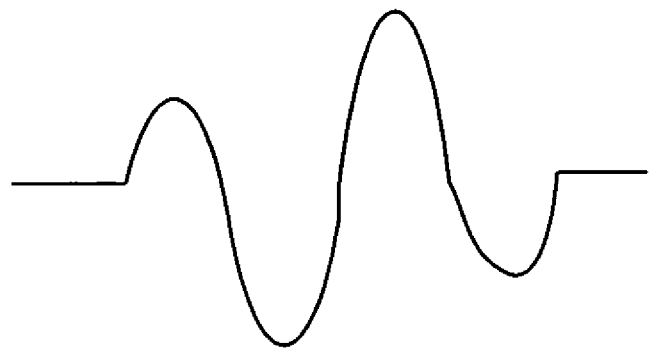

FIG. 6b is an illustrative baseband signal generated by the transmitter.

Figure 7:
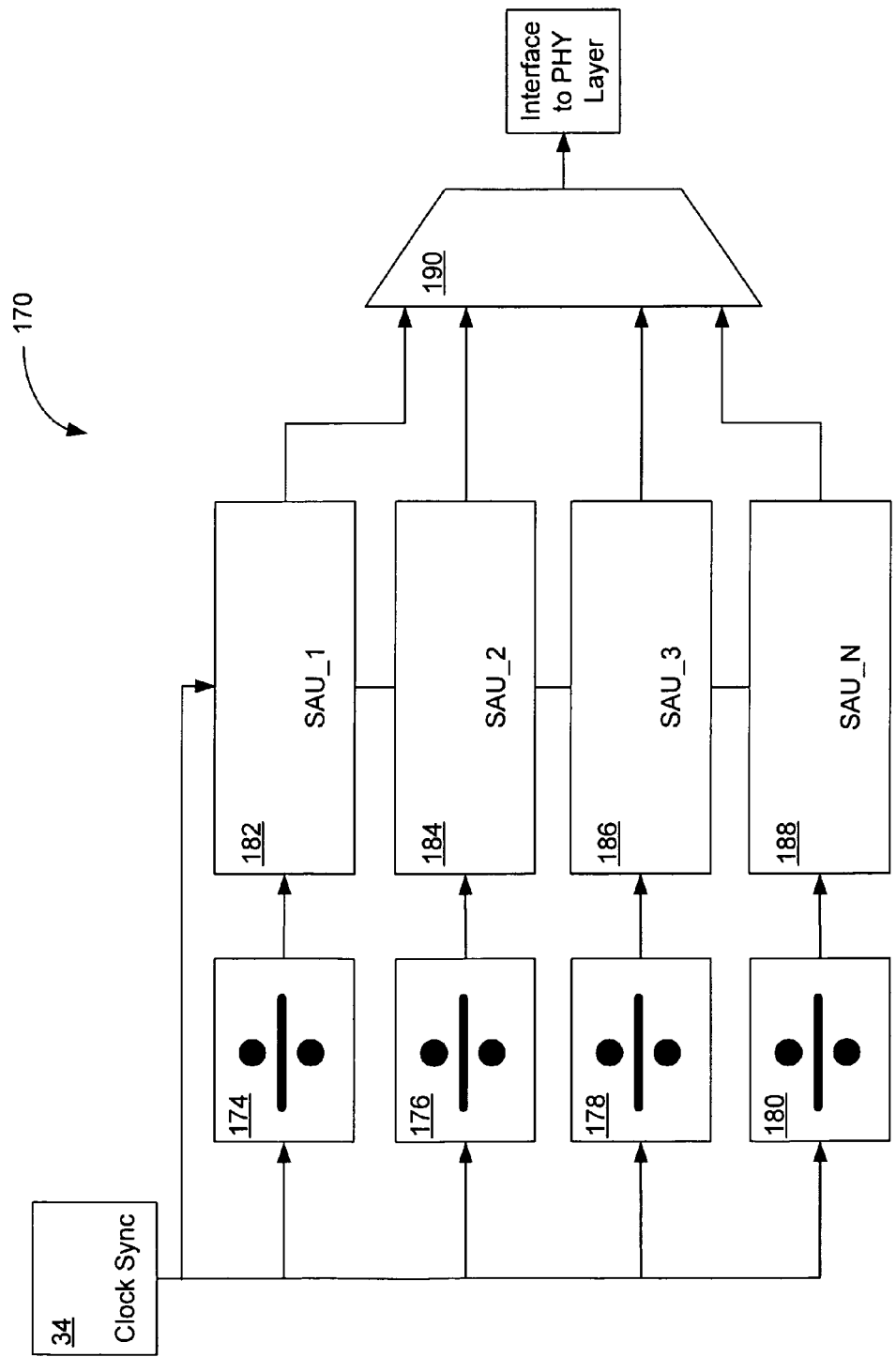

FIG. 7 presents a block diagram of a pulse repetition frequency module.

FIG. 8 is a block diagram of a pulse amplitude modulation module.

Figure 9A:
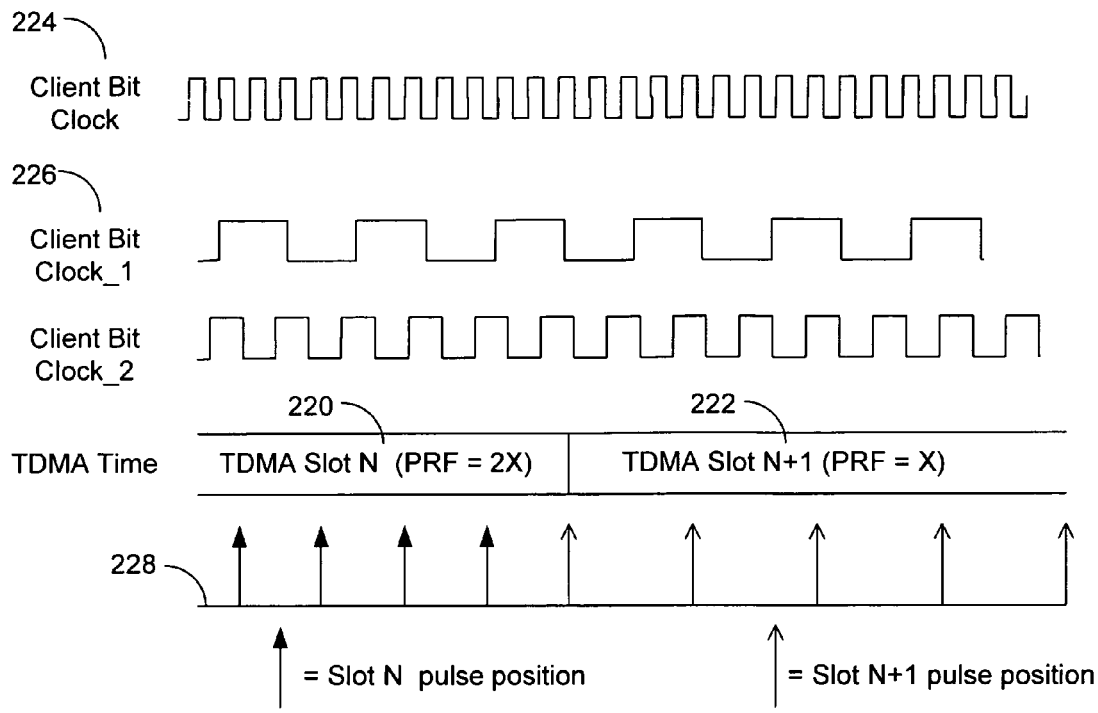

FIG. 9a provides an illustrative example of an output signal with a variable pulse repetition frequency.

Figure 9B:
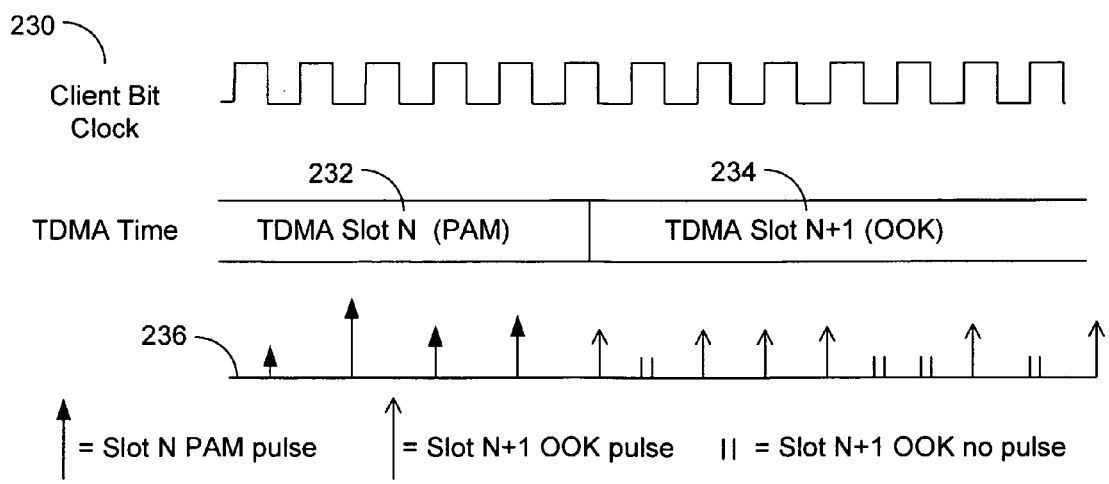

FIG. 9b provides illustrative examples of output signals using different modulation techniques.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

The present invention provides a Time Division Multiple Access (TDMA) system and method that allows sharing a wireless medium which can identify and operate in a variable bit rate environment. The present invention provides a system and method capable of supporting devices with vastly different bandwidth requirements. Some devices, such as television receivers, require high bandwidth data communication. The higher cost associated with a television allows for the design of a television receiver having high data rate modulation techniques. Other devices such as home thermostats have lower bandwidth requirements and require simpler modulation techniques for lower cost connectivity.

The present invention operates within a network which allows devices to operate at different bit rates and employ different modulation techniques and permits sharing of the same wireless medium. Additionally, the transceivers of the present invention are capable of negotiating links between one another which are dependent on environmental characteristics such as noise and reflection. Further still the present invention allows backward compatibility to be designed into the network so that newer devices communicate with older devices. The system preferable works in a baseband or ultra wide band environment. However, the system and method may operate in other environments which use carrier signals.

Figure 1:
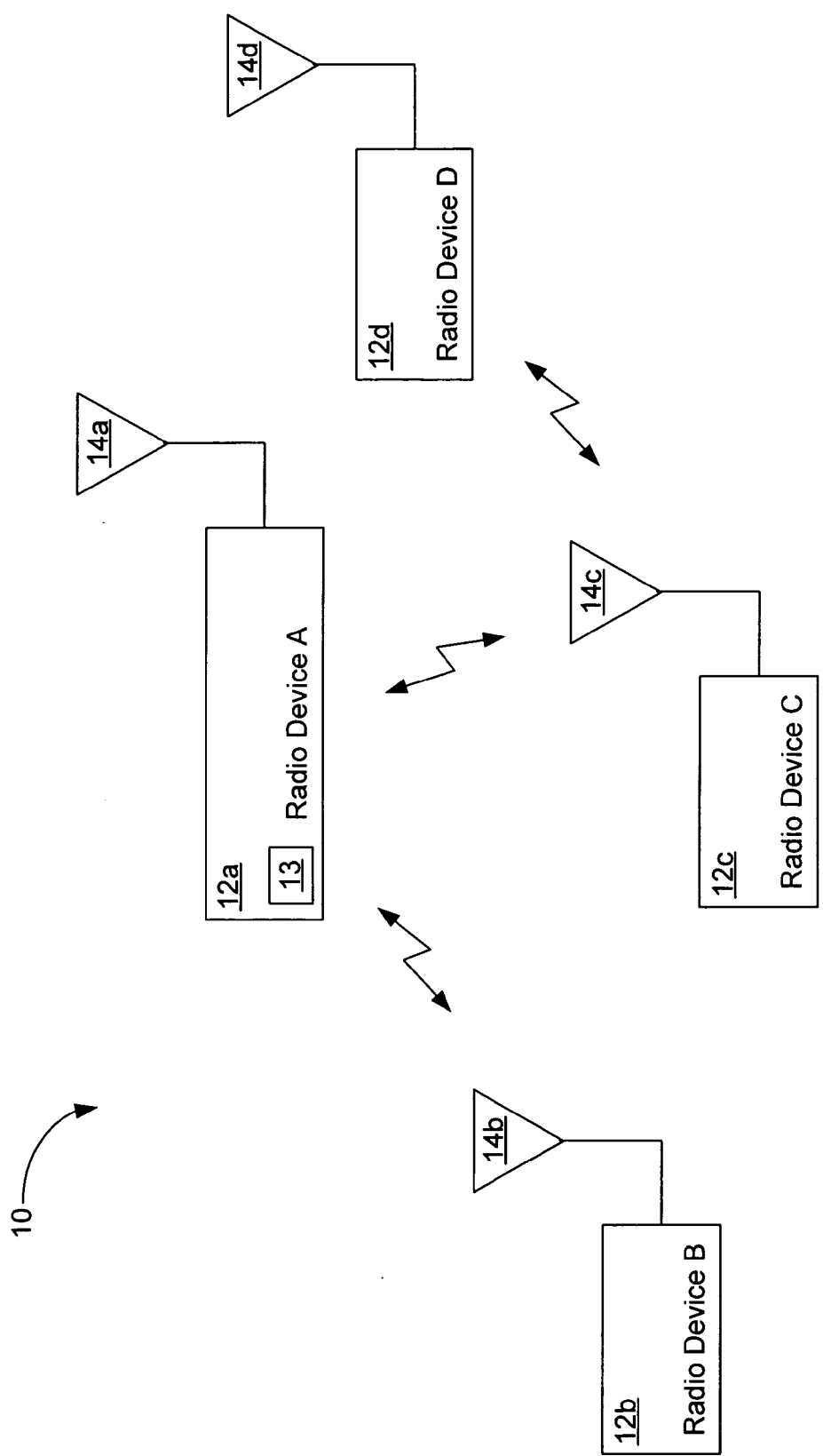
FIG. 1 is a wireless network system having a plurality of mobile transceiver devices.

The TDMA system and method of the present invention will be more fully understood by first referring to FIG. 1, which shows a wireless network system 10 comprising a plurality of mobile transceivers 12a–12d, also identified as radio devices A–D, wherein each transceiver has a corresponding antenna 14a–14d. One transceiver 12a is acting as a "master" transceiver or device, while the remaining transceivers 12b, 12c and 12d act as "slave" transceivers. It shall be appreciated by those skilled in the art that the terms transceiver and devices may be used interchangeably. The particular transceiver node 12a–12d which acts as the master transceiver may change depending upon the manner in which the network system 10 is used, and thus the components and hardware for each transceiver 12a–12d are generally the same.

By way of example and not of limitation, the illustrative example of four transceivers 12a–12d are shown in network system 10. The master transceiver 12a carries out the operation of managing network communications between transceivers 12b–12d by synchronizing the communications between the transceivers using a master clock 13. Therefore, the master transceiver 12a maintains communication with slave transceivers 12b through 12d. Additionally, the slave transceivers are able to communicate amongst themselves, as illustrated by the typical communications between slave transceiver 12c and 12d. The systems and methods for communications are described in further detail below.

The present invention provides that the master transceiver need not include dedicated communication hardware to provide simultaneous open links between itself and all the slave transceivers. However, the master transceiver must maintain communications with the slave transceivers so that all transceivers on the network are properly synchronized. The present design guarantees that media can be broadcast to many nodes at the same time. It shall be appreciated by those skilled in the art and having the benefit of this disclosure, that the network system 10 may comprise a larger number of transceivers, with the actual number of transceivers in network system 10 varying depending on the particular application for the system 10.

Figure 2:
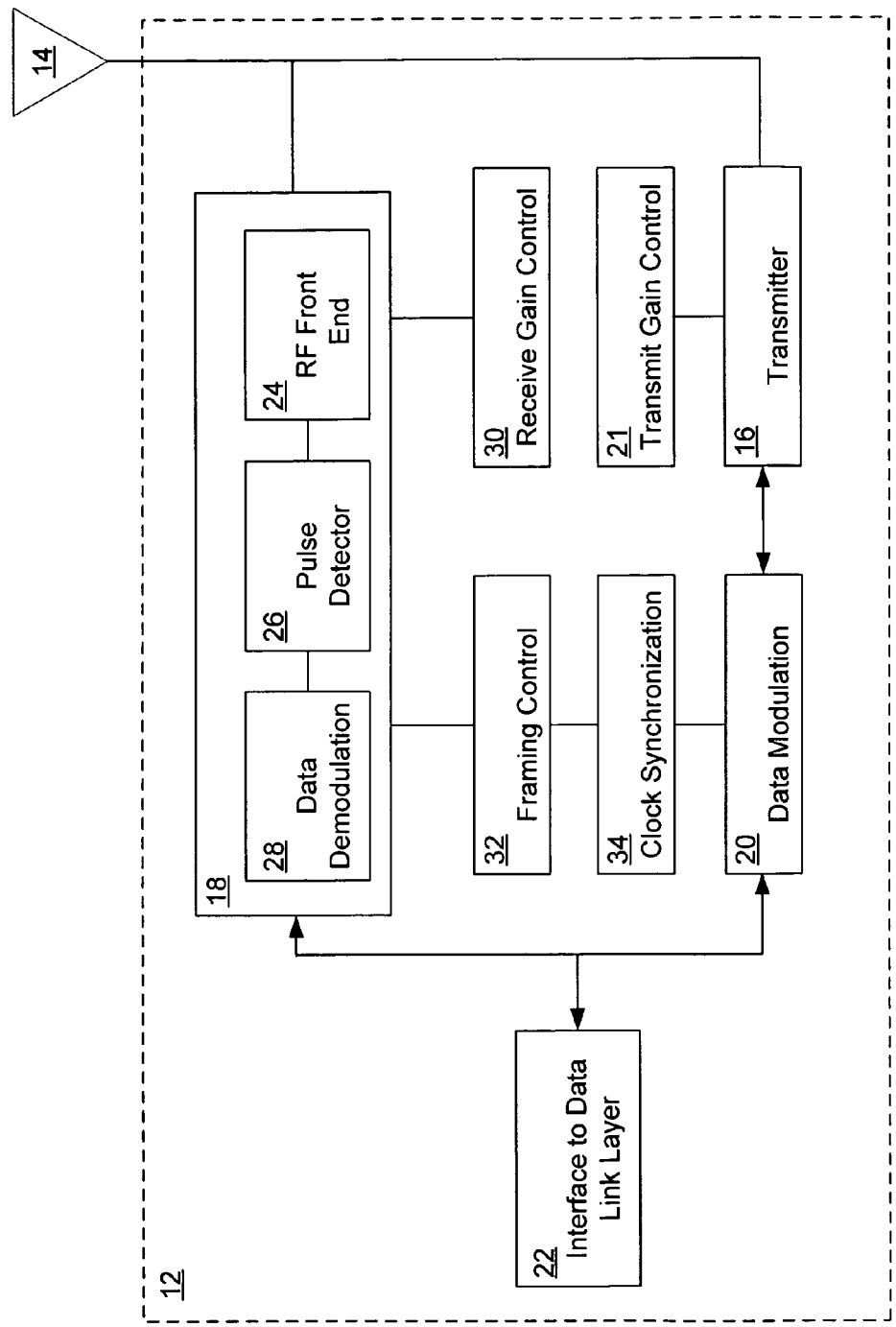
FIG. 2 is a functional block diagram of the physical layer of a node having a transmitter and data modulation component.

Referring now to FIG. 2 as well as FIG. 1, a functional block diagram of the "Physical layer" implementation of a transceiver node device 12 in accordance with the present invention is shown. The "Physical layer" as described herein refers to the Physical layer according to the Open Systems Interconnection (OSI) Reference Model.

Each transceiver node device 12a–12d is structured and configured as transceiver device 12 of FIG. 2. The transceiver node device 12 comprises an integrated circuit or like hardware device providing the functions described below. Transceiver device 12 comprises an antenna 14 coupled to a transmitter 16 and a receiver 18. The transmitter 16 is connected to a data modulation unit 20. Transmitter gain control 21 is coupled to transmitter 16. Both the transmitter 16 and the data modulation unit 20 are coupled to an interface to Data Link Layer (DLL) 22. The receiver 18 coupled to the antenna 14 comprises generally an RF front end section 24, a pulse detector 26, a data demodulation or data recovery unit 28. A receiver gain control 30 is included in association with receiver 18.

A framing control unit 32 and a clock synchronization unit 34 are operatively coupled to the receiver 18 and the data modulation unit 20 associated with the transmitter 16. Transmitter 16 and receiver 18 are operatively coupled to antenna 14, preferably through a RF switch (not shown).

Data Link Layer interface 22 comprises circuitry which provides an interface or higher communication exchange layer between the Physical Layer of network 10, as embodied in transceiver 12, and the "higher" layers according to the OSI reference model. The layer immediately "above" the Physical Layer is the Data Link Layer. Output information from the Data Link Layer is communicated to data modulation unit 20 via interface 22. Input data from receiver 18 is communicated to the Data Link Layer via interface 22.

The data modulation unit 20 comprises circuitry which converts information received from interface 22 into a modulated stream of pulses. Various forms of pulse modulation may be employed by data modulator 20. One modulation scheme which may be used is on-off keying wherein the presence and absence of pulses respectively represent the "ones" and "zeros" for digital information. In this situation, data modulation unit 20 causes a pulse to be generated at the appropriate bit time to represent a "one", or causes the absence of a pulse to represent a "zero". In another embodiment, pulse amplitude modulation is employed wherein the amplitude of a pulse represents a digital value. The number of bits that may be represented by a pulse depends on the dynamic range and signal-to-noise ratio available. The data modulation method is described in further detail below.

The pulse stream generated by data modulator 20 and transmitted by transmitter 16 is synchronized with a master clock associated with the clock synchronization function 34, and is sent in an appropriate time slot according to a frame definition provided by the framing control unit 32, as described further below. In order to maintain a synchronized network, one device must serve the function of being a clock master and maintaining the master clock for the network 10.

Transmitter 16 is preferably a wide band transmitter device which generates a modulated ultra wide band pulse stream output from data modulation unit 20 and transmits the shaped modulated ultra wide band pulse stream via antenna 14 as a stream of electromagnetic radio frequency (RF) pulses. In the preferred embodiment, data is transmitted via impulses having 100 picosecond risetime and 200 picosecond width, which corresponds to a bandwidth of between about 2.5 GHz and 5 GHz. The transmitter gain control 21 preferably comprises a power control circuit.

Antenna 14 comprises a radio-frequency (RF) transducer and is structured and configured for both transmission and reception. During reception, antenna 14 converts RF pulses into corresponding voltage signals. During transmission antenna 14 converts an electric current containing pulse information into corresponding ultra wide band RF pulses. In one preferred embodiment, antenna 14 is structured and configured as a ground plane antenna having an edge with a notch or cutout portion operating at a broad spectrum frequency at about 3.75 GHz. The structure and configuration of antenna 14 may vary in order to accommodate various frequency spectrum ranges. Antenna 14 may alternatively comprise a "dual antenna" configuration wherein transmission and reception occur from different portions or regions of antenna 14.

Clock synchronization unit 34 includes a clock function (not shown) which maintains a clock or timing device (also not shown). The clock is preferably a conventional voltage controlled oscillating crystal device which operates at a multiple of the bit rate for the system 10. In the case of the master transceiver 12a, the clock in the clock synchronization unit serves as a master clock 13 (FIG. 1) for network 10. As noted above, any transceiver node 12a–12d may act as the master transceiver for the network. A clock recovery function, described further below, is included with receiver 18 wherein timing information from the master clock is recovered.

Framing control unit 32 comprises circuitry which carries out the operations of generating and maintaining time frame information with respect to transmitted data. Framing control unit 32 is utilized by the transceiver node which is acting as the master transceiver by dividing up the transmitted pulse information into "frames". Data transmission between the several node transceivers 12a–12d is preferably carried out via a Medium Access Control protocol utilizing a Time Division Multiple Access (TDMA) frame definition.

Subject to the TDMA frame definition, data is transmitted as short RF pulses and is divided into discrete data frames, wherein each data frame is further subdivided into "slots". The frame definition is provided to transceivers 12a–12d from the Data Link Layer via interface 22. The TDMA frame definition is defined by Medium Access Control (MAC) sublayer software associated with the Data Link Layer. Framing control unit 32 in master transceiver 12a generates and maintains time frame information through use of "Start-Of-Frame" (SOF) symbols, which are used by the slave transceivers 12b–12d to identify the frames in the incoming data stream.

In the most general terms, the preferred receiver 18 includes a RF front end module 24, pulse detection unit 26, and a data demodulation unit 28. The receiver 18 detects modulated ultra wide band pulses generated by the transmitter. The receiver apparatus comprises a RF front end section 28, a pulse detection unit 26, and data recovery unit 24. A more detailed description of the preferred receiver of the present invention is provided below.

Transceiver 12 further includes circuitry providing means for controlling the gain of signals received and transmitted shown as gain control units 30 and 21, respectively. The transmit gain control unit 21 carries out the operation of controlling the power output of the transmitter 12 and receive gain control unit 30 carries out the operation of controlling the input gain of the receiver 18. The optimized gain for each control unit is dependent on maximizing the power demands for transceiver communications while minimizing the energy consumption of each control unit.

As described in further detail below, the physical layer of the system 10 includes a transmitter unit 16 and a data modulation unit 20, the completion of which is capable of modifying the pulse repetition frequency and modulation technique for the base band signals. Preferably, the transmitter unit 16 and data modulation unit 20 are configured to modify the modulation scheme for the network 10 by shifting from on-off keying modulation to pulse amplitude modulation and vice versa. Additionally, the receiver 18 is capable of detecting the variable pulse repetition frequency and different modulation techniques generated by the transmitter 16.

Figure 3:
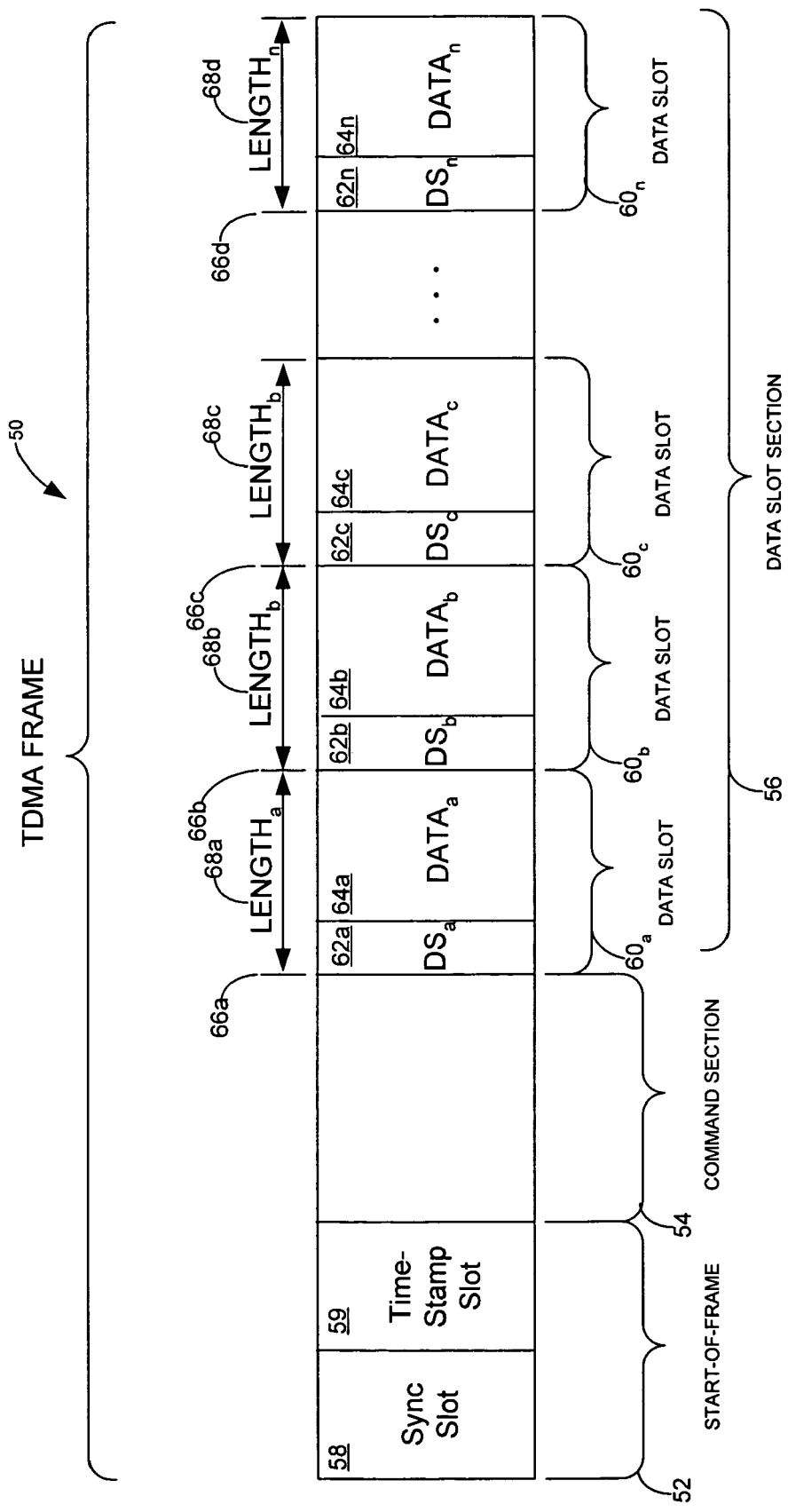
FIG. 3 is a TDMA frame generated by the ultra wideband transmitter.

Referring to FIG. 3 there is shown an illustrative TDMA frame useable in the present invention. The TDMA frame 50 is an illustrative frame arrangement provided by the Medium Access Control (MAC) protocol of the present invention. The MAC protocol of the present invention provides services at the MAC sublayer of the Data Link layer according to the Open Systems Interconnection (OSI) reference model. The Logical Link Control (LLC) sublayer is the (upper) portion of the Data Link layer and provides virtual linking services to the Network layer of the OSI reference model. Data transmission framing for transceivers 12a–12d is provided by the MAC protocol executed within each transceiver on the network. The MAC protocol provides a TDMA frame definition and a framing control function. The TDMA architecture divides data transmission time into discrete data "frames". Frames are further subdivided into "slots".

TDMA frame 50 is an illustrative frame arrangement provided by the MAC layer protocol of the present invention. In general, the MAC layer of the present invention provides the master transceiver 12 with the functions and routines for carrying out the operation of managing each TDMA frame 50 which is communicated in the network system 10. In the preferred embodiment, the TDMA frame 50 comprises a Start-Of-Frame section 52, a command section 54, and a data slot section 56. The data slot section 56 is further subdivided into a plurality of data slots 60a through 60n.

The architecture of TDMA frame definition 50 provides for isochronous data communications between the master transceiver 12a and the slave transceivers 12b–12d. It shall be appreciated by those skilled in the art that isochronous data communication refers to processes where data must be delivered within a certain time constraint. Isochronous data communication is supported by frame definition 50 by sharing transmit time so that each transceiver 12a–12d is permitted to transmit data during a specific allotted time slot.

Asynchronous communication is also supported by the frame definition 50. It shall be appreciated by those skilled in the art that asynchronous data communications refers to communications in which data can be transmitted intermittently rather than in a steady stream. Within the TDMA frame, slot may be assigned to be random access using a technique such as Carrier Sense Multiple access with Collision Avoidance (CSMA-CA). For the illustrative CSMA-CA case, the master 12a creates a slot to be used as a random access slot. The master 12a then communicates through the command slot to all random access capable devices that this slot is now available for random access. The master 12a also communicates the start and length of the command slot. The random access slot might be used for all Internet Protocol (IP) devices, for example, such that all IP capable devices will listen to and transmit using only the random access slot reserved for IP traffic. Each IP device on the network listens to this slot. If no communication is detected in this slot for certain number of frames, this channel is considered "free". A device wishing to transmit waits until the channel is free before retransmitting, and then start packet transmission by transmitting to the random access slot for each frame until the transmission was completed. Various schemes for collision avoidance are known in the art.

The Start of Frame section 52 includes a synchronization slot 58 and a timestamp slot 59. The synchronization slot 58 identifies the start of each new TDMA frame and synchronizes the master transceiver 12a with the slave transceiver 12b through 12d. The synchronization slot 58 from the master transceiver 12a includes a master synchronization code which is generated at least once per frame. Preferably, the master synchronization code comprises a unique bit pattern which identifies the master transceiver as the source of transmission with timing information associated with the master clock in the clock synchronization unit of the master transceiver. By way of example and not of limitation, the master synchronization code uses a 10-bit code comprising "0111111110". Preferably, master 12a synchronization is performed with On-Off Keying where 1's are represented by full amplitude pulses and 0's are represented by lack of pulses.

Various encoding schemes known in the art may be used to guarantee that the master synchronization code within synchronization slot 58 will not appear anywhere else in the data sequence of the TDMA frame 50. For example, a common encoding scheme is 4B/5B encoding, where a 4-bit values is encoded as a 5-bit value. Several criteria or "rules" specified in a 4B/5B, such as "each encoded 5-bit value may contain no more than three ones or three zeros" and "each encoded 5-bit value may not end with three ones or three zeros", ensure that a pulse stream will not have a string of six or more ones or zeros. Other encoding techniques known in the art may also be used for master synchronization code including bit stuffing or zero stuffing.

The timestamp slot 59 includes a bit-field which is incremented by a timestamp counter (not shown) in the master transceiver 12a. The timestamp slot is used by the master transceiver 12a and the slave transceivers 12b through 12d to coordinate the assignment or changes in slot parameters. The timestamp slot 59 permits the master 12a to dynamically reassign the data slot time and length parameters. In operation, the master 12a determines a predetermined time interval required for the modification of the data slot time and/or data slot length to the slave transceivers. Additionally, the master schedules each participating slave device to make the switch to the new time/length at a specific time which is provided by a timecode resident in timestamp slot 59.

The command section 54 contains a protocol message exchanged between the transceivers 12a through 12d of network 10, are used by the master transceiver 12a for managing network communications. The flow of protocol messages in the command slot 42 may be governed, for example, by a sequence retransmission request or "SRQ" protocol scheme wherein confirmation of protocol transactions are provided following completion of an entire protocol sequence.

The data slots 60a through 60n are assigned by the master transceiver 12a to requesting slave transceivers 12b through 12d. Data slots 60a through 60n are further structured and configured to be arranged dynamically and permit the reassigning of the relative start time and the length of the data slots 60a through 60n within the data slot section 56 of the frame 50. This arrangement allows the master transceiver 12a to dynamically manage the usage of the data slot section 56 to optimize the bandwidth capabilities of the transport medium of the network and the transceivers of the network. Thus, the master transceiver 12a may allocate a wider data slot to a slave transceiver which can utilize a wider bandwidth. Conversely, the master transceiver 12a may also allocate a narrower data slot to a slave transceiver which has more limited bandwidth capabilities. The granularity for data slots 60a through 60n is one (1) bit. The granularity for data slots 60a through 60n is allocated by the master transceiver 12a.

Each data slot 60a through 60n has a corresponding data synchronization sub-slot 62a through 62n and a data payload sub-slot 64a through 64n. The data payload 64a through 64n contains the encoded actual data or bit information which is transmitted from the source transceiver to the target transceiver. The data synchronization sub-slot 62a through 62n are used by each transceiver for providing timing synchronization signals to a corresponding target transceivers to accommodate for propagation delays between the source and target transceivers. Propagation delays vary in length depending on the distance between source and target transceivers. As described above, the master synchronization code provides timing signals to allow slave transceivers to synchronize with the master clock of the master transceiver 12a. Likewise, the symbols within the data synchronization sub-slot 62a through 62n are symbols which allow target slave transceivers to synchronize with corresponding source slave transceivers using similar synchronization algorithms such as phase offset detectors and controllers. Proper target to source transceiver synchronization is fundamental for reliable data communication exchange between the slave transceiver.

Each data slot 60a through 60n has a corresponding slot start time 66a through 66n and corresponding slot length 68a through 68n. The slot start time 66a through 66n corresponds to the time position within the data slot section 56 of the frame at which point the device begins its transmission. The slot length 68a through 68n measured from the slot start time provides the time position within the frame at which transmission is terminated for the data slot for each frame. The slot lengths 68a through 68n corresponds to the bandwidth allocated to the devices within the data slot section 56 of the frame and may be of varying lengths as assigned by the master transceiver 12a.

The framing control unit 32 in the slave transceivers 12b through 12d provide framing means such as local counters, correlators, phase lock loop functions, and phase offset detectors and controllers which allow frame synchronization between slave transceivers 12b through 12d and the master transceiver 12a to be reestablished when the size or length of frame 50 is altered by the master transceiver 12a.

Referring back to FIG. 1, as well as FIG. 3, each device operates as a finite-state machine having at least three states: offline, online and engaged. Each slave transceiver maintains and tracks its state by storing its state information internally, usually in random access memory (RAM) (not shown) or other memory means known in the art. The state of each slave transceiver is further maintained and tracked by the master transceiver 12a by storing the states of the slaves in a master table which is well known in the art and which is stored in RAM.

Each slave transceiver must first be registered with the master transceiver 12 before the slave transceiver may engage in data communication with the other slave transceivers of the network. Once a transceiver is considered "online" it is ready for communication. A slave transceiver that is in the "online" state is ready to send or receive data from the other devices on the network 10. Additionally, a slave transceiver is in the "online" state if it is not currently engaged in communication with other slave transceivers. A slave transceiver is "engaged" when the transceiver is currently communicating with one or more slave transceivers. For example, where a source slave transceiver is transmitting audio signal data to a target slave transceiver, both the source and target slave transceiver are in the "engaged" state.

The slave transceivers 12b through 12d use the command slot for requesting data transmission and indicating its start-up (on-line) state, engaged state, or shut-down (off-line) state. The data slots are used for data transmission between the node transceivers of the network. Generally, each transmitting device of the networks is assigned one or more corresponding data slots within the frame in which the device may transmit data directly to another slave transceiver without the need for a "store and forward" scheme as is presently used in the prior art.

Figure 4:
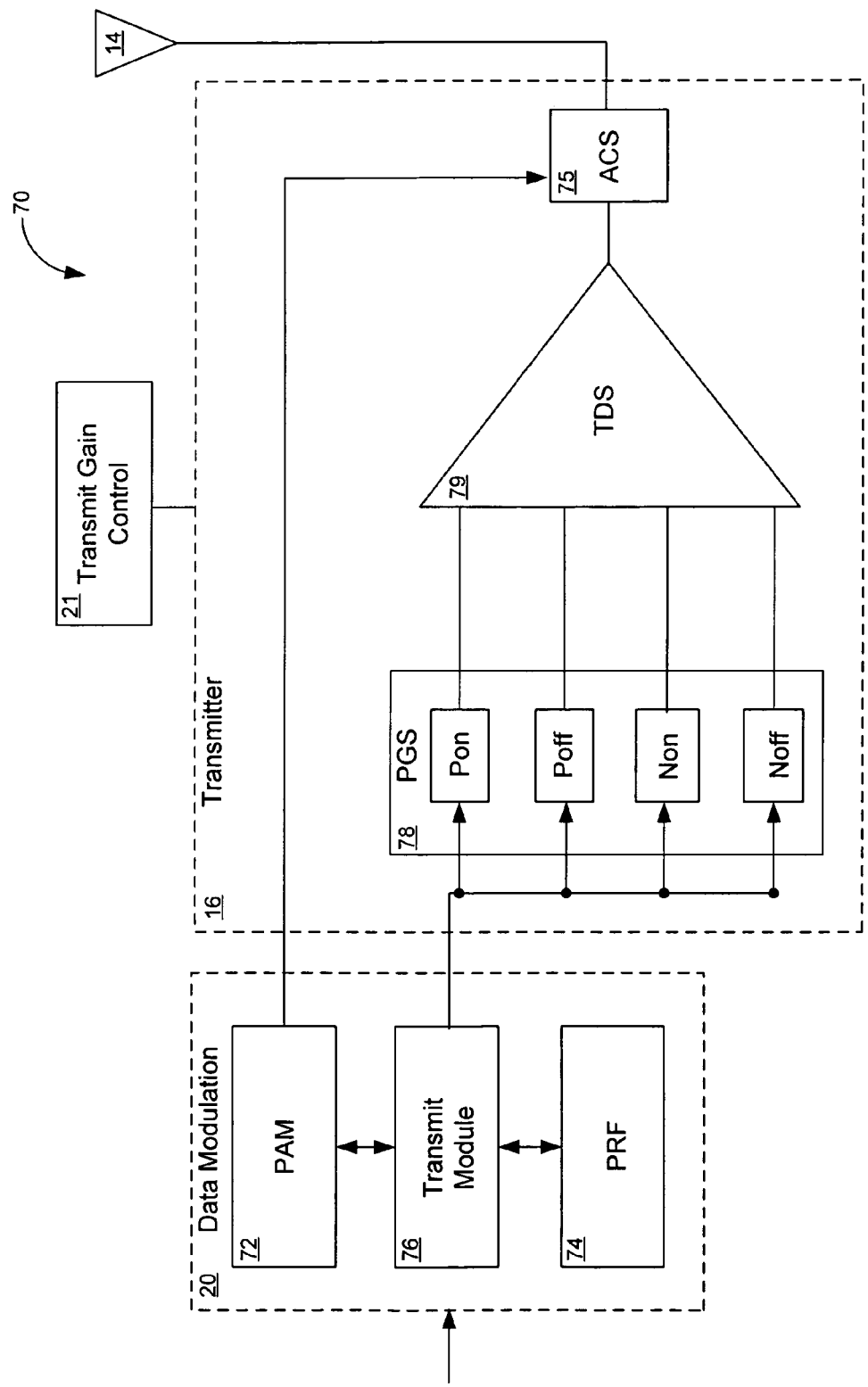
FIG. 4 is a block diagram of the transmitting system of the present invention.

Referring to FIG. 4, there is shown a block diagram of the transmitter system of the present invention which may be used in either master transceiver or slave transceiver. The transmitter system 70 includes a data modulation unit 20 coupled to a transmitter 16, a transmit gain control unit 21 which is also coupled to transmitter 16, and an antenna 14 which receives signals from transmitter 16 for transmission via antenna 14. The data modulation unit 20 further comprises a pulse amplitude modulation module 72, a pulse repetition frequency module 74 and a transmit module 76. The pulse repetition frequency module is configured to provide a variable pulse repetition frequency to transmitter system 70. The pulse amplitude modulation module is configured to provide modulation techniques in which the amplitude for pulses may be varied depending on the value represented by the pulse amplitude modulated pulse. The transmit module 76 is in direct communication with pulse amplitude module 72 and pulse repetition frequency module 74. The pulse amplitude modulation module 72 is coupled to amplitude control system 75. The pulse amplitude modulation module 72, amplitude control system 75, and the pulse repetition frequency module 74 are described in further detail below. Preferably, data modulation unit 20 is configured to generate a digital stream of pulse data. Preferably, the digital stream of pulse data generated by the data modulation unit 20 includes a transmit module configured to generate a clock pulse and pulse amplitude modulation module configured to generate a data stream for a desired pulse amplitude.

The transmit module 76 provides the ability to distinguish between different modulation techniques such as pulse amplitude modulation (PAM) and on-off keying (OOK). If the transmit module detects that a signal is modulated by OOK, the OOK signal is communicated directly to the transmitter 16. If the transmit module detects that a signal is modulated by PAM, then the transmit signal is communicated to the PAM module 72.

Additionally, the transmit module 76 communicates with a pulse repetition frequency module 72. Preferably, the transmit pulses are digital clock pulses which are communicated at the particular pulse repetition frequency. The pulse repetition frequency module 72 performs the function of varying the pulse repetition frequency and the corresponding bit rate for communications. The bit rate is varied depending on environmental and network demands. Another benefit provided by the pulse repetition frequency module 72 is to reduce the amount of interference generated by the baseband transmitter by periodically modifying the pulse repetition rate of the baseband transmitter.

The transmit module 76 generates the transmit pulse signals which are communicated to the transmitter 16 pulse generator system 78. The transmit pulses are digital clock pulses which are communicated at a particular pulse repetition frequency. Additionally, the transmit module 76 provides the ability to distinguish between different modulation techniques such as pulse amplitude modulation (PAM) and on-off keying (OOK). If the transmit module detects that a signal is modulated by OOK, the OOK signal is communicated directly to the transistor drive system 79. If the transmit module detects that a signal is modulated by PAM, then the transmit signal is communicated to the PAM module 72.

The modulation technique for the pulse stream generated by the data modulator 20 is synchronized with the master clock 13 associated with the clock synchronization unit 34, and is sent in an appropriate time slot according to a frame definition provided by the framing control unit 32. To maintain a synchronized network, one device must serve the function of being a clock master and maintaining the master clock 13 for the network 10.

Various forms of pulse modulation may be employed by data modulation unit 20. In the simplest case on-off keying is used wherein the presence and absence of pulses represent the "ones" and "zeros", respectively, of digital information. In this typical situation, the data modulation unit 20 causes a pulse to be generated at the appropriate bit time to represent a "one" or causes the absence of a pulse to represent a "zero."

Another modulation method that may be used is pulse amplitude modulation in which the amplitude of a pulse is represented by a digital value. The amplitude control system 75 receives data signals from the pulse amplitude module 72 in which the data signals provide data about the desired pulse amplitude to be generated by the amplitude control system 75. Two illustrative amplitude control systems described in further detail below include a variable gain amplifier and an attenuator.

Figure 5A:
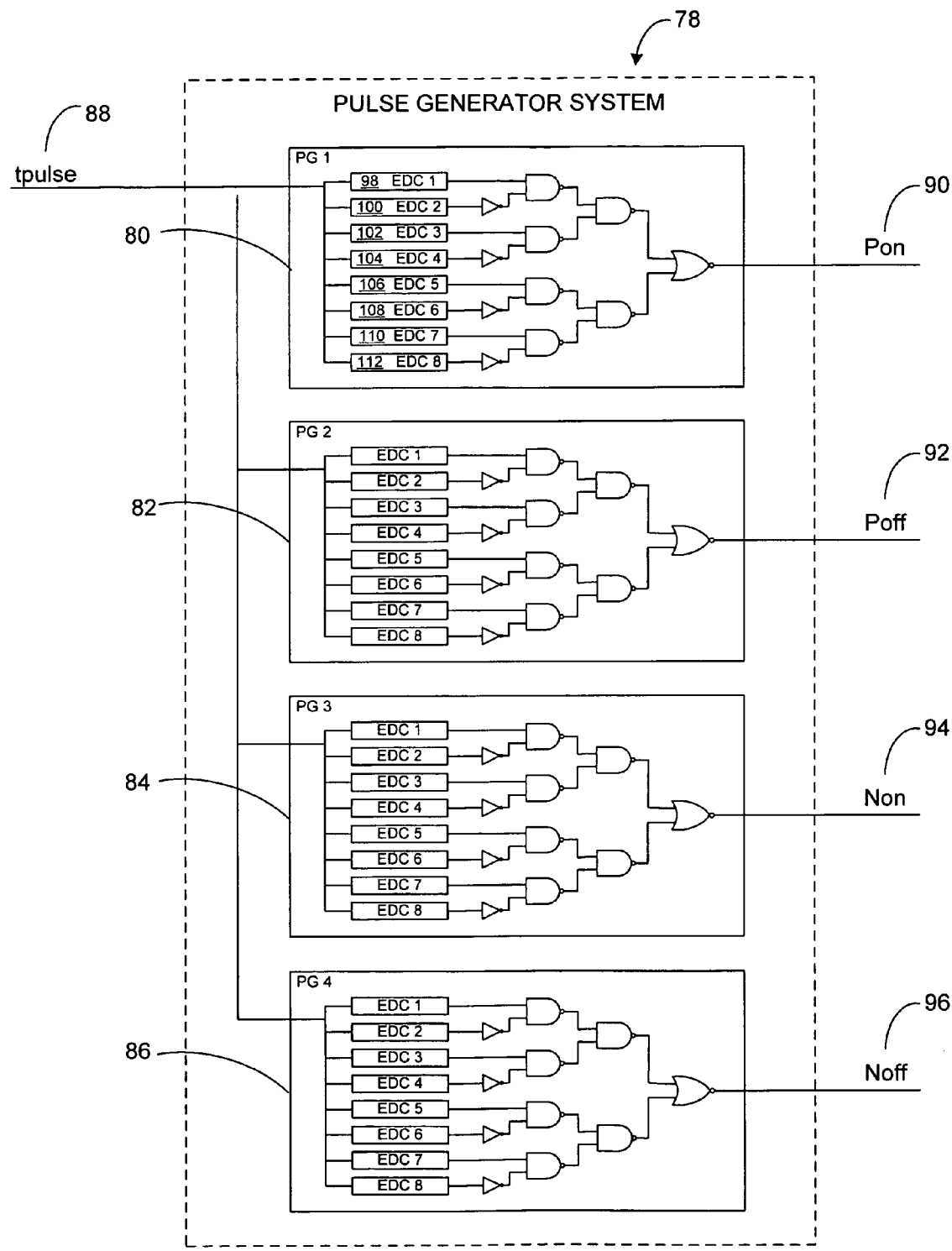
FIG. 5a is a block diagram of the pulse generator system of the ultra wideband transmitter.

Referring to FIG. 5a as well as FIG. 4 there is shown a block diagram of the pulse generator system for the ultra wide band transmitter. In its preferred embodiment, the present invention is a baseband signal generator that generates an output RF signal from digital data pulses. The baseband signal generator of the present invention comprises a pull-up circuit and a pull-down circuit which generate the RF baseband output signal that approximates the shape of the filter transfer function associated with the antenna 14. The pull-up circuit includes a pulse generator system 78 and a drive system 79 which produces positive going signal excursions and negative going signal excursions. The composite of the positive going signal excursions and the negative going signal excursions generate the RF output base band signal that approximates the shape of the filter transfer function associated with the antenna 14.

By way of example and not of limitation, the output baseband signal may have a spectral content bandwidth which matches the filter bandwidth between 2.5 GHz to 5.0 GHz. Note that in the preferred embodiment, the filter is an antenna transmitting signals between 2.5 GHz and 5.0 GHz.

As previously described, the pull-up circuits and pull-down circuits also include a pulse generator system 78. By way of example and not of limitation, the pulse generator system includes four pulse generators 80, 82, 84 and 86. In operation, the pulse generating system 78 presents the rising edge of an input transmit pulse 88 to the one or more pulse generators. The pulse generator system generates output signals that are presented to the drive system as pull-up turn-on signals 90, pull-up turn-off signals 92, pull-down turn-on signals 94, and pull-down turn-off signals 96.

Preferably, each typical pulse generator includes four pairs of coupled edge delay circuits which are coupled to one another. By way of example, pulse generator 80 includes edge delay circuits 98 through 112, which function in pairs. Preferably the pulse generator 80 is composed of four (4) pairs of edge delay circuits in which each pair of edge delay circuit includes an edge delay circuit that generates a leading edge and another edge delay circuit that generates a trailing edge. By way of example, the first pair of edge delay circuits in pulse generator 80 include a first edge delay circuit 98 which generates the leading edge for the delayed pulse signal and the second edge delay circuit 100 which generates the trailing edge for the delayed pulse signal. It shall be appreciated by those skilled in the art having the benefit of this disclosure that each pair of edge delay circuits generates the leading and trailing edges for each delayed pulse signal. More particularly, each edge delay circuit may comprise a switched bank of capacitors that provide a programmable edge delay. It shall be appreciated by those skilled in the art having the benefit of this disclosure that the outputs from each pair of edge delay circuits are combined to produce a composite series of delayed output pulses for pulse generator 80. Each of the remaining pulse generators 82, 84 and 86 also each generate a composite series of delayed output pulses. The delayed output pulses from pulse generators 80, 82, 84 and 86 are presented as pull-up turn-on signals 90 (identified as Pon), pull-up turn-off signals 92 (identified as Poff), pull-down turn-on signals 94 (identified as Non), and pull-down turn-off signals 96 (identified as Noff) to the drive system 79. The drive system 79 combines these pull-up turn-on signals 90, pull-up turn-off signals 92, pull-down turn-on signals 94, and pull-down turn-off signals 96 to generate a waveform which is communicated to antenna 14.

Figure 5B:
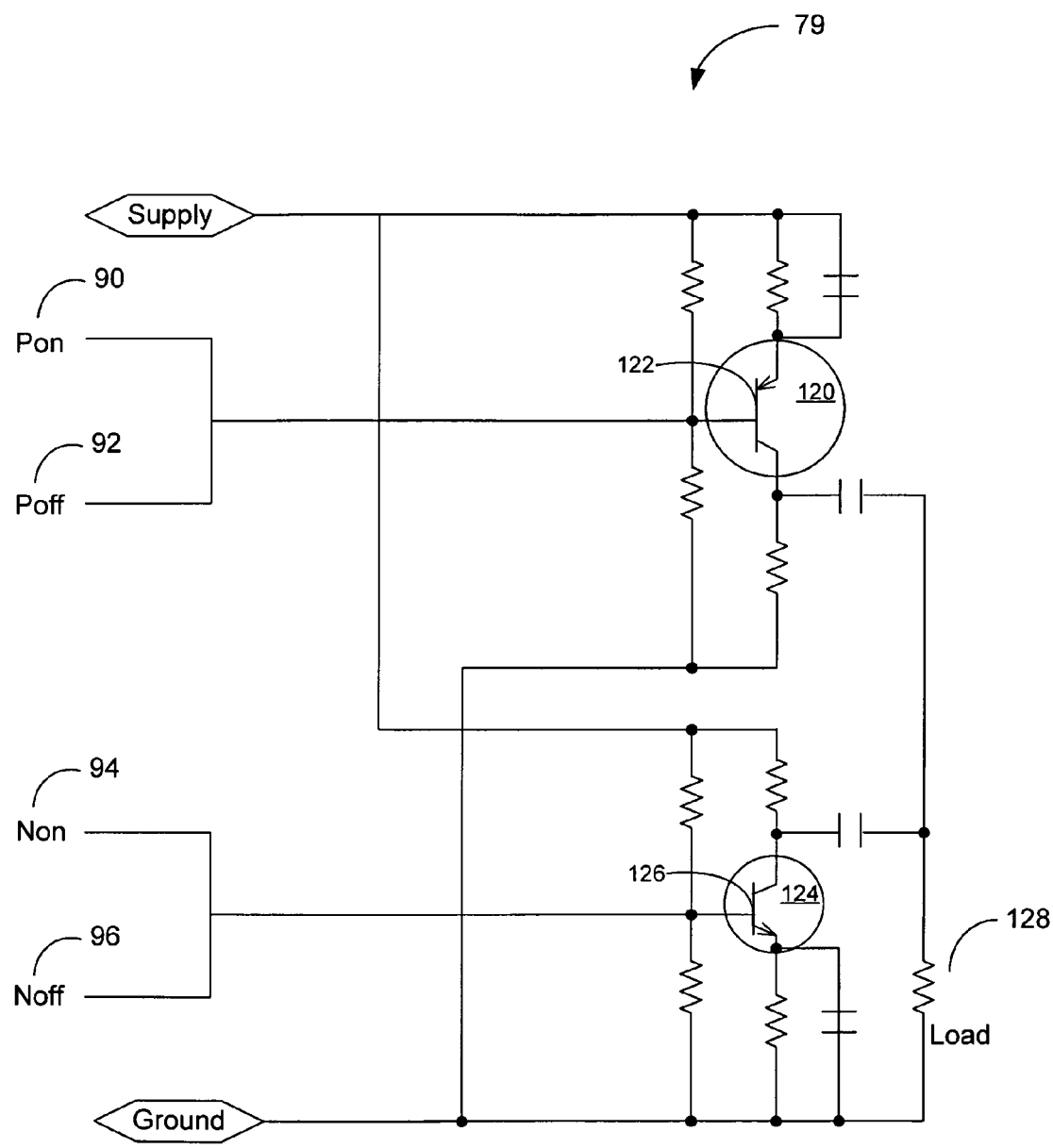
FIG. 5b is a block diagram of the transmitter drive system of the ultra wideband transmitter.

Referring to FIG. 5b there is shown an illustrative example of a transistor drive system for the ultra wide band transmitter. The transistor drive system combines and amplifies the signals generated by the pulse generator system to produce a shaped modulated pulse stream for transmission by antenna 14. Preferably the drive system is also operatively coupled to the pulse amplitude modulation module. The drive system receives the pull-up circuit which generates the positive going signal excursion includes a bipolar pnp transistor 120. The pnp transistor 120 is a pull-up transistor in a common emitter configuration that receives the pull-up signals at its base 122. Generally, the pull-up signals are a combination of the Pon signals 90 and the Noff signals 96. The pull-down circuit which generates the negative going signals excursion includes a bipolar npn transistor 124. The npn transistor 124 is a pull-down transistor in a common emitter configuration that receives the pull down signals at its base 126. Generally, the pull-down signals are a combination of the Poff signals 92 and the Non signals 94. The outputs from the bipolar transistors are capacitively coupled to the load 128.

Preferably, the output signal generated by the signal generator operate between 2.5 GHz to 5.0 GHz. At these operating frequencies, the base-emitter capacitance at each transistor 120 and 124 prevents the bipolar transistors from rapidly turning off. To ensure rapid turnoffs of the pnp transistor 120 and the npn transistor 124, the transistor of the present invention generates "turn off" signals which are presented to transistors 120 and 124 and are represented as Poff signals 92 and Noff signals 96. The turn-off signals discharge the base-emitter capacitance at each transistor 120 and 124. The discharging of the base-emitter capacitive charge turns off the transistors. Additionally, "turn on" signals may be generated without having to generate simultaneously the "turn off" signals when there is little or no base-emitter capacitive charge.

Referring to FIG. 6*a* as well as FIG. 5*a* and FIG. 5*b* there is shown a method for employing the pulse generator and transistor drive system of FIG. 5*a* and FIG. 5*b*, respectively. The method 150 includes a process 50 in which input transmit pulse 88 for transmission is communicated to pulse generator system 78.

The method then proceeds to process block 154 where a positive signal excursions generated by a pull-circuit are produced. The pulse generator system 78 comprises a plurality of pulse generators 82, 82, 84 and 86 which produce pull-up turn-on signals 90 (identified as Pon), pull-up turn-off signals 92 (identified as Poff), pull-down turn-on signals 94 (identified as Non), and pull-down turn-off signals 96 (identified as Noff), respectively. The positive signal excursions are generated preferably by a bipolar pnp transistor 120. The pnp transistor is a pull-up transistor in a common emitter configuration that receives the pull-up signals at its base 122. Generally, the pull-up signals are a combination of the pull-up turn on (Pon) signals 90 and the pull down turn off signals (Noff) 96. The method then proceeds to process 156.

At process 156, negative signal excursions are generated by a pull-down circuit. The pull-down circuit which generates the negative going signal excursion includes a bipolar npn transistor 124. The npn transistor 124 is a pull-down transistor in a common emitter configuration the receives the pull down signals at its base 126. Generally, the pull down signals are a combination of the pull-up turn off (Poff) signals 92 and the pull-down turn-on (Non) signals 94. The method then proceeds to process 158.

At process 158, the positive and negative signal excursions are combined to generate a base band signal. Preferably, the positive and negative signal excursions are combined and amplified by the drive system 79 to generate a RF pulse stream. The method then proceeds to process 160.

At process 160, the RF pulse stream from process 158 is communicated to an antenna 14 for transmission. Preferably, the RF pulse stream is a baseband signal is a doublet as shouwn in FIG. 6*b*.

Referring to FIG. 7 there is shown a block diagram of a pulse repetition frequency module and pulse amplitude modulation module which is resident on the Medium Access Control (MAC) 170 layer of the transmitter of the present invention. In general the MAC 170 is provided at the Data Link Layer, which is located between the Network Layer and Physical Layer of the OSI reference model. The MAC 170 of the present invention provides the circuitry for varying the pulse repetition frequency.

The MAC 170 comprises an integrated circuit or like hardware device providing the functions described herein. It shall be appreciated by those skilled in the art that some MAC services may be implemented in software. The MAC functions implemented herein refer to those MAC functions implemented in hardware that are unique to the present invention. The MAC hardware includes a clock synchronization function 34 (FIG. 2) which is coupled to a plurality of frequency dividers 174, 176, 178 and 180 in which each frequency divider is configured to divide down the clock speed. A plurality of slot allocation units 182, 184, 186 and 188 having different pulse repetition frequencies and different modulation techniques are each coupled to frequency dividers 174, 176, 178 and 180, respectively. Each slot allocation unit 182 through 188 is operatively coupled to a multiplexer/demultiplexer unit 190 which is operatively coupled to an interface to the Physical Layer 192.

The clock sync function 34 is configured to synchronize a local clock on the transmitter to the master transceiver 12*a* clock 13. The clock sync function 34 produces a high speed clock that is a multiple of the highest pulse repetition frequency supported by the transmitter of the present invention. Each programmable frequency divider 174 through 180 is capable of generating a varying pulse repetition frequency by dividing down the high-speed clock associated with the clock sync function 34.

Each slot allocation unit 182 through 188 may have a different pulse repetition frequency and different modulation technique. Preferably, each slot allocation unit 182 through 188 also has a common undivided clock (not shown) to serve as reference for counting out the start location of each slot based on a uniform time base. Additionally, each slot allocation unit 182 through 188 is programmed to provide a symbol stream to the physical layer and transmit data pulses and clocking information at the appropriate pulse repetition frequency.

Further still each slot allocation unit 182 through 188 provides data in the appropriate data width to support different modulation techniques. By way of example, for on-off keying, data will be supplied at a rate of one-bit per clock cycle. Additionally for a pulse amplitude modulated signal having four (4) levels, the modulation technique provides for two bits to be communicated per clock cycle. For pulse amplitude modulated signals having eight (8) levels, the modulation technique provides for three bits to be communicated per clock cycle.

In operation each slot allocation unit has an associated start time, length, and modulation technique. When the start time occurs, the slot allocation unit will take over control the physical layer through communications with multiplexor/demultiplexor 190. Each slot allocation unit provides data signals having the proper width and proper pulse repetition frequency in the form of data control and clock. At the end of an illustrative slot, as determined by slot length, the slot allocation unit relinquishes control and the following slot allocation unit has the opportunity to take control during its respective designated transmit time.

The structure and function of the slot allocation unit is more carefully described in the patent application titled "Baseband Wireless Network for Isochronous Communication" having patent application Ser. No. 09/393,126. It shall be appreciated by those of ordinary skill in the art, that the slot allocation unit described in this invention is not confined to isochronous communications as described above.

Additionally, it shall be appreciated by those of ordinary skill in the art having the benefit of this disclosure that the data and clock information supplied by the MAC 170 to the physical layer will be fed to the pulse generation system 78 and the drive system 79 which will generate the proper waveform at the appropriate time and amplitude.

The Mux/Demux 190 carries out the operation of merging outgoing bit streams from slot allocation units 182 through 188 into a single signal transmitted to the transmit module 76 and then to pulse generating system 78 and drive system 79.

Figure 8A:
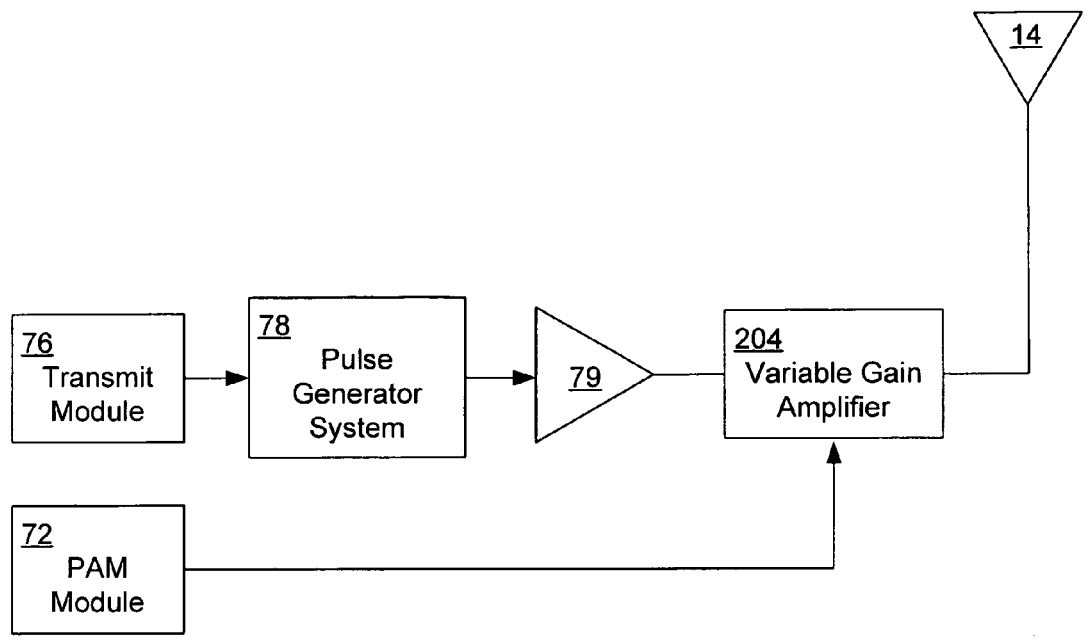

Referring to FIG. 8*a*, there is show n a block diagram of one embodiment of an amplitude control system having a variable gain amplifier 204. A transmit module which generates a clock pulse at the proper time, communicates the clock pulse to the pulse generator system 78 of the transmitter 16. The output from pulse generator system 78 is submitted to a drive system 79 which generates a RF pulse stream that is communicated to a variable gain amplifier 204. The variable gain amplifier 204 is operatively coupled to the transmitting antenna 14. A pulse amplitude modulation module 72 is coupled to the variable gain amplifier 204. The variable gain amplifier 204 amplifies the pulse generated by the drive system 79.

In operation, the pulse generator system 78 is supplied with a clock or strobe signal from transmit module 76. The transmit module 76 generates a clock pulse which is communicated to the pulse generator system 78. The pulse amplitude modulation module 72 is configured to generate a data stream which is communicated to the amplitude control system having a variable gain amplifier 204. The output from the drive system 79 is submitted to the variable gain amplifier 204 which provides the requisite gain to generate an RF pulse for transmission by antenna 14 having the desired amplitude.

Figure 8B:
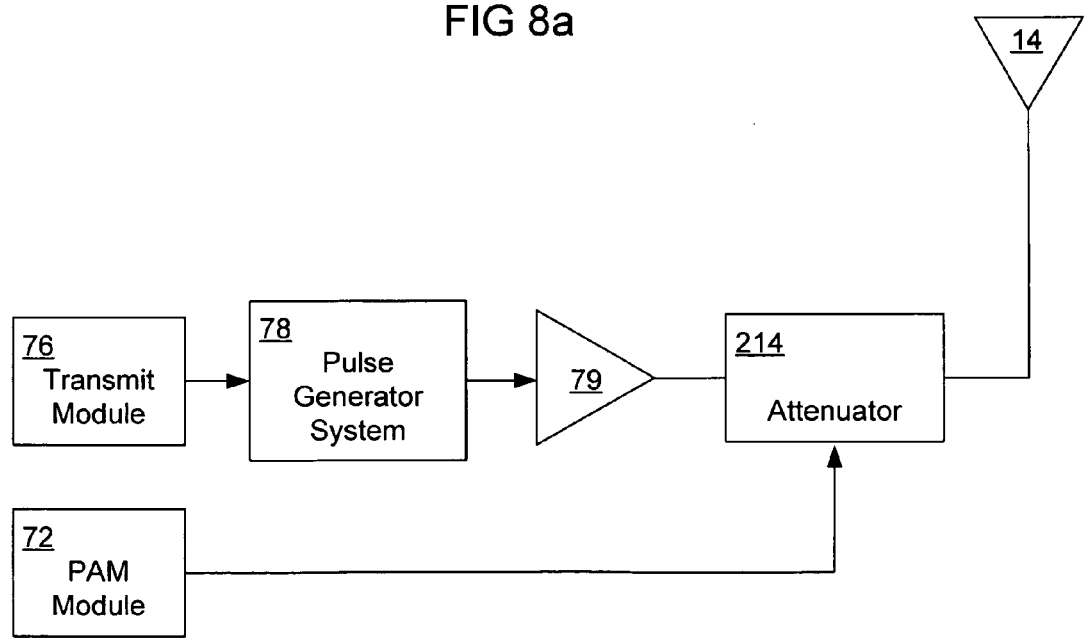

Referring to FIG. 8*b*, there is shown an alternative block diagram of another amplitude control system having an attenuator 214. A transmit module which generates a clock pulse at the proper time, communicates the clock pulse to pulse generator system 78. The output from pulse generator 78 is submitted to a drive system 79 which generates a RF pulse stream at a maximum amplitude. The maximum amplitude output from the drive system 79 is communicated to a digitally controlled attenuator 214 which is coupled to antenna 14. A pulse amplitude modulation module 72 is coupled to the attenuator 214 which attenuates the waveform generated by the drive system 79. The attenuator 214 reduces the amplitude of the waveform as needed to provide the correct signal for transmission by antenna 14.

In operation, the pulse generator system 78 is supplied with a clock or strobe signal from transmit module 76. The transmit module 76 generates a clock pulse which is communicated to the pulse generator system 78. The pulse amplitude modulation module 72 is configured to generate a data stream which is communicated to the amplitude control system having an attenuator 214. The output from the drive system 79 is then submitted to attenuator 214 which reduces the amplitude of the RF pulses according to the output generated by the data interface 216.

The present invention is configured to employ various pulse repetition frequencies and various modulation techniques. Referring back to FIG. 7, FIG. 8*a*, FIG. 8*b*, and FIG. 3, when a new data slot such as data slot 64*b* (FIG. 3) is to be transmitted the slot allocation unit, e.g. slot allocation unit 184, is activated and signals to the data modulation module 20, the modulation technique to be employed. If the modulation technique is on-off keying, the data interface for the pulse amplitude modulation module 72 will be disabled, and the amplifier 206 or attenuater 214 will be set to a fixed value, typically full power. If the modulation technique is pulse amplitude modulation, the data interface for the pulse amplitude modulation module 72 will be enabled to support the number of bits used for pulse amplitude modulation. For example if the transmitter supports both four (4) level pulse amplitude modulation (2 bits) and eight (8) level pulse amplitude modulation (3 bits), either, two or three bits of the digital interface are enabled. By way of example and not of limitation, the data interface will typically be tied to logic '1', so that symbols 001, 011, 101 and 111 are used for the four (4) level pulse amplitude modulated signals. In an alternative embodiment, the pulse amplitude modulation unit may be reconfigured to ignore one bit of the three bit value and generate four equally spaced voltage outputs representing the symbols 00, 01, 10, and 11. It shall be appreciated by those skilled in the art that there are other alternatives for the illustrative four symbols.

Referring to FIG. 9*a*, as well as FIG. 3 and FIG. 1, there is shown a typical illustrative example of the timing for two TDMA slots having different pulse repetition frequencies. A first typical TDMA slot 220 and second typical TDMA slot 222 provides communications within a data slot.

To accommodate variable pulse repetition frequencies for each TDMA slot, the master sync code synchronizes communications between transceiver devices using a clock synchronization unit 34 operating at a nominal pulse repetition frequency that the system 10 will support. The transmitter 16 and receiver 18 are capable of frequency multiplying the clock from the clock synchronization unit 34 to support higher pulse repetition frequencies. The pulse repetition frequencies employed may depend on the devices particular bandwidth demands, noise constraints, or signal reflection.

Client bit clock__1, 224, provides the timing for the pulse repetition frequency associated with TDMA Slot N+1, 222. The signals transmitted by TDMA slot 222 are transmitted during the leading edge of client bit clock__1, 224. Client bit clock__2 226 provides the timing for the pulse repetition frequency associated with TDMA slot N 220. The signals transmitted by TDMA Slot N 220 are transmitted during the leading edge of client bit clock__2 226. The pulse repetition frequency for TDMA Slot N, 220, is two times greater, i.e. faster, that the pulse repetition frequency for TDMA Slot N+1, 222. The pulse repetition frequency for TDMA Slot N, 220, and TDMA Slot N+1, 222, is identified by the frequency pulses, identified by arrows, shown in line 228.

Referring to FIG. 9*b* there is shown a typical example of the transceiver timing having a different modulation method for each TDMA slot. A client bit clock 230 provides the timing for the two typical TDMA slot in the data slot section of TDMA frame. The two typical TDMA frames are identified as TDMA Slot N, 232, and TDMA Slot N+1, 234. It shall be appreciated by those skilled in the art having the benefit of this disclosure that for TDMA Slot N, 232, the signal transmitted employs pulse amplitude modulation as depicted by the symbols in line 236. The timing for each of the pulses having a different amplitude is established by the client bit clock 230. Additionally, it shall be appreciated by those skilled in the art that for TDMA Slot N+1 234 the signal transmitted employs on-off keying as depicted by the symbols in line 236. Again, the timing for each of the pulses operating with on-off keying is established by the client bit clock 230.

The techniques described above use different bit pulse repetition frequencies and modulation techniques for baseband communications or ultra-wide-band communications. An additional modulation technique referred to as pulse-position modulation is well known in the art and may also be employed with the present system and method. During pulse position modulation, pulses are transmitted at some basic symbol frequency, e.g. 20 MHz. At a 20 MHz symbol repetition frequency that pulses are spaced 50 nanoseconds apart. A pulse falling exactly where expected may indicate a binary "1", while a pulse delayed by some small delta time may indicate a binary "0".

The system of the present invention may be broadened for use with carrier signals and other modulation technique. Therefore, while embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A transmitter system configured to transmit pulse amplitude modulated signals, comprising:
   a clock interface configured to generate a clock signal;
   a pulse generator system, operatively coupled to said clock interface, said pulse generator system configured to shape a plurality of incoming pulses;
   a drive system operatively coupled to said pulse generator system, said drive system configured to amplify and combine said plurality of incoming pulses;
   a data interface configured to generate a data signal; and
   a variable gain amplifier operatively coupled to said data interface and operatively coupled to said drive system, said variable gain amplifier configured to provide an appropriate gain to said drive system to obtain a desired amplitude.

2. The transmitter system of claim 1 further comprising a pulse repetition frequency module, said pulse repetition frequency module operatively coupled to said pulse generator system and configured to generate variable pulse repetition frequencies.

3. A transmitter system configured to transmit pulse amplitude modulated signals, comprising:
   a clock interface configured to generate a clock signal;
   a pulse generator system, operatively coupled to said clock interface, said pulse generator system configured to shape a plurality of incoming pulses;
   a drive system operatively coupled to said pulse generator system, said drive system configured to amplify and combine said plurality of incoming pulses to generate a plurality of output signals;
   a data interface configured to generate a data signal; and
   an attenuator operatively coupled to said data interface and operatively coupled to said drive system, said attenuator configured to reduce the amplitude of said plurality of output signals and provide a plurality of modified output signals having a desired amplitude.

4. The transmitter system of claim 3 further comprising a pulse repetition frequency module, said pulse repetition frequency module operatively coupled to said pulse generator system and configured to generate variable pulse repetition frequencies.

5. A transmitter system configured to generate base band signals capable of being modulated using pulse amplitude modulation, comprising:
   a data modulation unit configured to generate a digital stream of pulse data which is synchronized with a master clock, said data modulation unit comprising:
      a transmit module configured to generate a clock pulse; and
      a pulse amplitude modulation module configured to generate a data stream for a desired pulse amplitude;
   a transmitter unit coupled to said data modulation unit, said transmitter unit configured to receive said digital stream of pulse data and generate a radio frequency (RF) pulse stream;
   an amplitude control system operatively coupled to said transmitter unit and said pulse amplitude modulation module, said amplitude control system configured to generate a modified amplitude of said RF pulse stream; and
   an antenna coupled to said transmitter unit, said antenna configured to transmit said modified amplitude of said RF pulse stream.

6. A transmitter system, comprising:
   a data modulation unit configured to generate a digital stream of pulse data which is synchronized with a master clock, the data modulation unit comprising a pulse amplitude modulation module, which is configured to vary the amplitude of the digital stream of pulse data and a transmit module operatively coupled between a pulse repetition frequency module and the pulse amplitude modulation module, said transmit module configured to distinguish between different modulation techniques;
   a transmitter unit coupled to said data modulation unit, said transmitter unit configured to receive said digital stream of pulse data and generate a radio frequency (RF) pulse stream;
   an antenna coupled to said transmitter unit, said antenna configured to transmit said RF pulse stream, wherein said RF pulse stream is an ultra wide band pulse stream;
   wherein said transmitter unit comprises a pulse generator system operatively coupled to said transmit module, said pulse generator system configured to generate said ultra wide band pulse stream for transmission by said antenna;
   wherein said pulse generator system is configured to generate a plurality of pull-up turn-on signals, a plurality of pull-up turn-off signals, a plurality of pull-down turn-on signals, and a plurality of pull-down turn-off signals;
   wherein said transmitter unit further comprises a drive system operatively coupled to said pulse generator system and configured to combine said plurality of pull-up turn-on signals, said plurality of pull-up turn-off signals, said plurality of pull-down turn-on signals, and said plurality of pull-down turn-off signals to generate said ultra wide band pulse stream; and
   wherein said drive system is operatively coupled to said pulse amplitude modulation module, said pulse amplitude modulation module is configured to generate a desired pulse amplitude for said digital stream of pulse data.

* * * * *

UNITED STATES PATENT AND TRADEMARK OFFICE
CERTIFICATE OF CORRECTION

| | |
|---|---|
| PATENT NO. | : 6,952,456 B1 |
| APPLICATION NO. | : 09/599969 |
| DATED | : October 4, 2005 |
| INVENTOR(S) | : Aiello et al. |

It is certified that error appears in the above-identified patent and that said Letters Patent is hereby corrected as shown below:

On the Title Page, Item (57), under "ABSTRACT", Lines 10-15, delete "This Abstract............of the claims.".

On Title Page 2, Item (56), under "FOREIGN PATENT DOCUMENTS", Line 2, delete "EP 0 825 794 A2 2/1998" and insert -- EP 0 825 794 A2 2/1998.........H04I 7/36 --, therefor.

On Title Page 2, Item (56), under "FOREIGN PATENT DOCUMENTS", Line 4, delete "EP 0 825 794 A3 1/2000" and insert -- EP 0 825 794 A3 1/2000.........H04I 7/36 --, therefor.

On Title Page 3, Item (56), under "OTHER PUBLICATIONS", Line 2, delete "Tranceivers" and insert -- Transceivers --, therefor.

In Column 13, Line 67, delete "shouwn" and insert -- shown --, therefor.

In Column 15, Line 19, delete "show n" and insert -- shown --, therefor.

In Column 16, Line 10, delete "attenuater" and insert -- attenuator --, therefor.

In Column 16, Line 47, delete "clock_2 226" and insert -- clock_2, 226 --, therefor.

In Column 16, Line 50, delete "clock_2 226." and insert -- clock_2, 226. --, therefor.

In Column 17, Line 1, delete "N+1" and insert -- N+1, --, therefor.

In Column 18, Line 10, in Claim 5, delete "pulse;" and insert -- pulse, --, therefor.

Signed and Sealed this
Nineteenth Day of June, 2012

David J. Kappos
*Director of the United States Patent and Trademark Office*